(12) United States Patent
Wasilczyk et al.

(10) Patent No.: US 10,092,991 B2
(45) Date of Patent: Oct. 9, 2018

(54) POLYMERIC LAPPING MATERIALS, MEDIA AND SYSTEMS INCLUDING POLYMERIC LAPPING MATERIAL, AND METHODS OF FORMING AND USING SAME

(71) Applicant: JH Rhodes Company, Inc., Phoenix, AZ (US)

(72) Inventors: George Wasilczyk, Allentown, PA (US); Brent Muncy, Clark Mills, NY (US); Scott Daskiewich, Oriskany, NY (US)

(73) Assignee: JH Rhodes Company, Inc., Phoenix, AZ (US)

( * ) Notice: Subject to any disclaimer, the term of this patent is extended or adjusted under 35 U.S.C. 154(b) by 117 days.

(21) Appl. No.: 15/222,779

(22) Filed: Jul. 28, 2016

(65) Prior Publication Data
US 2017/0028526 A1    Feb. 2, 2017

Related U.S. Application Data

(60) Provisional application No. 62/198,935, filed on Jul. 30, 2015.

(51) Int. Cl.
*B24B 37/22* (2012.01)
*B24B 37/24* (2012.01)
(Continued)

(52) U.S. Cl.
CPC .............. *B24B 37/24* (2013.01); *C08G 18/10* (2013.01); *C08G 18/12* (2013.01);
(Continued)

(58) Field of Classification Search
CPC ........ B24B 37/24; C08G 18/10; C08G 18/12; C08G 18/3206; C08G 18/4854;
(Continued)

(56) References Cited

U.S. PATENT DOCUMENTS

| 4,841,680 A * | 6/1989 | Hoffstein | B24B 37/24 |
| | | | 15/244.4 |
| 5,489,233 A * | 2/1996 | Cook | A47L 13/28 |
| | | | 451/41 |

(Continued)

FOREIGN PATENT DOCUMENTS

| JP | 2012035402 | 2/2012 |
| JP | 2014176950 | 9/2014 |

(Continued)

OTHER PUBLICATIONS

International Search Report and Written Opinion dated Nov. 7, 2016 in Application No. PCT/US2016/044571.
(Continued)

*Primary Examiner* — George Nguyen
(74) *Attorney, Agent, or Firm* — Snell & Wilmer L.L.P.

(57) ABSTRACT

A polymeric material suitable for use in lapping processes, media including the polymeric material, systems including the media, and methods of forming and using the polymeric material are disclosed. The polymeric material can be used to lap hard surfaces, such as sapphire surfaces. The lapping process can be performed after a grinding process and before a polishing process.

20 Claims, 3 Drawing Sheets

(51) Int. Cl.
   *C08J 9/00*      (2006.01)
   *C08G 18/76*     (2006.01)
   *C08G 18/48*     (2006.01)
   *C08G 18/32*     (2006.01)
   *C08G 18/66*     (2006.01)
   *C08G 18/12*     (2006.01)
   *C08G 18/10*     (2006.01)
   *C08G 101/00*    (2006.01)

(52) U.S. Cl.
   CPC ..... *C08G 18/3206* (2013.01); *C08G 18/4854* (2013.01); *C08G 18/6674* (2013.01); *C08G 18/7621* (2013.01); *C08J 9/0066* (2013.01); *C08G 2101/005* (2013.01); *C08J 2205/044* (2013.01); *C08J 2363/02* (2013.01); *C08J 2375/08* (2013.01)

(58) Field of Classification Search
   CPC ............ C08G 18/6674; C08G 18/7621; C08G 2101/005; C08J 9/0066; C08J 2205/004; C08J 2205/044
   USPC ............................................................ 451/41
   See application file for complete search history.

(56) References Cited

U.S. PATENT DOCUMENTS

| | | | | |
|---|---|---|---|---|
| 6,203,407 | B1* | 3/2001 | Robinson | B24B 37/26 451/41 |
| 7,435,165 | B2 | 10/2008 | Abaneshwar | |
| 2005/0276967 | A1* | 12/2005 | Prasad | B24B 37/24 428/314.8 |
| 2006/0003665 | A1* | 1/2006 | Thiele, II | A63H 27/10 446/180 |
| 2009/0011692 | A1* | 1/2009 | Miekka | B24D 3/346 451/354 |
| 2009/0258585 | A1* | 10/2009 | Miekka | B24D 3/346 451/523 |
| 2010/0273399 | A1* | 10/2010 | Li | C07D 235/06 451/41 |
| 2011/0293914 | A1* | 12/2011 | Maurer | B29C 44/569 428/304.4 |
| 2011/0318566 | A1* | 12/2011 | Miller | B32B 5/18 428/312.2 |
| 2012/0025126 | A1* | 2/2012 | Vo | C08J 9/0066 252/62 |
| 2012/0047818 | A1* | 3/2012 | Lopez | E04D 13/076 52/12 |
| 2012/0118481 | A1* | 5/2012 | Gordon-Duffy | B29C 44/06 156/78 |
| 2012/0184635 | A1* | 7/2012 | Eberstaller | C08J 9/0038 521/85 |

FOREIGN PATENT DOCUMENTS

| | | |
|---|---|---|
| KR | 101478430 | 12/2014 |
| WO | 2013081665 | 6/2013 |

OTHER PUBLICATIONS

Notification Concerning Transmittal of International Preliminary Report on Patentability, dated Feb. 8, 2018, in Application No. PCT/US2016/044571.

* cited by examiner

POLYMERIC LAPPING MATERIALS, MEDIA AND SYSTEMS INCLUDING POLYMERIC LAPPING MATERIAL, AND METHODS OF FORMING AND USING SAME

CROSS-REFERENCE TO RELATED APPLICATIONS

This application claims the benefit of U.S. Provisional Patent Application Ser. No. 62/198,935, filed Jul. 30, 2015, and entitled POLYMERIC LAPPING MATERIALS, MEDIA AND SYSTEMS INCLUDING POLYMERIC LAPPING MATERIAL, AND METHODS OF FORMING AND USING SAME, the contents of which are hereby incorporated herein by reference, to the extent such contents do not conflict with the present application.

FIELD OF DISCLOSURE

The present disclosure generally relates to polymeric materials suitable for use in lapping processes, to lapping media and systems including polymeric material, and to methods of making and using polymeric lapping material, media, and systems.

BACKGROUND OF THE DISCLOSURE

Finishing a surface of a substrate often includes three steps: grinding, lapping and polishing. A grinding process can be used to create a rough form of the substrate, to reduce the substrate to a desired size, and/or remove large defects on the substrate surface. The grinding process generally has a relatively high material removal rate, often causes sub-surface damage to the substrate, and can leave a relatively rough surface finish on the substrate. Lapping is an intermediate finishing step that has a lower material removal rate than grinding and generally causes less sub-surface damage. The lapping process generally produces a relatively smooth surface. Finally, the polishing process has the lowest material removal rate and is generally used to provide smooth substrate surfaces often having defects less than about four microns in size, which are generally not visible to the naked eye.

When lapping hard surfaces, such as sapphire and the like, the lapping process often includes placing the substrate in a carrier and moving the substrate surface(s) relative to a lapping medium or lapping media in the presence of a slurry. The lapping media often include a soft metal plate, such as a copper plate, having patterned grooves formed into a surface of the plate. The slurry includes abrasive particles, such as diamonds in a carrier liquid. The lapping plate provides a hard surface for the abrasive particles to roll along as the substrate surface is moved relative to the lapping medium. Material is removed from the substrate surface using relative movement of the media and the substrate, which causes the abrasive particles roll or move. As the abrasive particles move, the particles scratch and/or puncture part of the substrate surface, causing small pieces of the substrate surface to be removed.

Typical metal plates are relatively large (e.g., having a diameter of about forty inches) and relatively thick (e.g., having a thickness of about one inch), making the plates heavy (e.g., about 150 pounds). Use of the large, heavy plates as lapping media may be desirable because the large metal plates can be used to lap large surfaces or a plurality of surfaces and the thickness of the metal plates helps the plates maintain their flatness and parallelism—e.g., parallel with respect to another plate or a platen.

During use, the metal lapping plates tend to wear due to abrasion from the abrasive particles in the slurry. The wear can result in reducing flatness and/or parallelism of the metal plates, which in turn can result lower uniformity of material removal rates across the substrate surface or even situations that cause the substrates to come out of the carrier. Additionally or alternatively, the grooves in the metal plate wear (decreases in depth) during use. Accordingly, the metal plates are periodically machined to restore desired flatness, parallelism, and/or grooves/groove depth. If the plate is not thick enough to reform the grooves, then a plate can be replaced with a thicker plate including grooves of the desired depth.

The machining process can be relatively expensive and time consuming. During the machining process, the plates are removed from the lapping system, the plates are ground to a desired flatness and/or parallelism and/or grooves are formed within the plates, and then the plates are reattached to the lapping system. All of these steps take considerable time and effort, which adds to a cost of lapping or finishing a surface of a substrate.

Accordingly, improved lapping materials, media, apparatus, and systems including improved lapping materials, as well as methods of forming and using the materials, media, apparatus, and systems are desired.

SUMMARY OF THE DISCLOSURE

Various embodiments of the present disclosure relate to improved materials, media, systems, and methods for lapping a surface of a substrate. While the ways in which various embodiments of the present disclosure address drawbacks of prior lapping materials, media, systems, and methods are discussed in more detail below, in general, various embodiments of the disclosure provide polymeric material, such as polymeric foam material, and media including polymeric material that enable relatively high lapping material removal rates and removal rate uniformities from a substrate surface. The polymeric media (media including polymeric material) can be easily replaced and/or reworked, resulting in less downtime of lapping apparatus and lower costs associated with the lapping process. Further exemplary embodiments provide methods of forming and using the lapping material and lapping media. As set forth in more detail below, it was surprisingly and unexpectedly found that the polymeric materials described herein can be used to lap relatively hard materials, such as those described below, in a cost-efficient and time-efficient manner. In particular, the polymeric material and media exhibited higher than expected removal rates, lasted longer than expected, and produced lapped surfaces with relatively few defects.

In accordance with exemplary embodiments of the disclosure, a lapping system includes a platen, a polymeric material attached to the platen, and a slurry comprising abrasive particles. Exemplary systems can also include a carrier to retain one or more substrates during a lapping process. The polymeric material can be a thermoset material, a thermoplastic material, combinations of thermoset materials, combinations of thermoplastic materials, or a combination of one or more thermoplastic and/or thermoset materials. Further, the polymeric material can be a foam or nonfoam. By way of examples, the polymeric material can include one or more thermoset materials, such as polyurethane, polyurea, a polyurethane-polyurea hybrid, polyimide, polyarimid, epoxy, and/or other hybrids of such materials.

Exemplary polymeric materials (e.g., foam materials) have a density ranging from about 0.85 g/cm$^3$ to about 3.0 g/cm$^3$, or about 0.9 g/cm$^3$ to about 1.3 g/cm$^3$, or about 1.0 g/cm$^3$ to about 1.25 g/cm$^3$. Additionally or alternatively, the polymeric materials (e.g., thermoset materials) have a compressibility (e.g., a Japanese industrial standard (JIS) 1096 compressibility) between about 1.0% and about 15%, or about 1.0% to about 10%, or about 1.0% to about 8%. Additionally or alternatively, dynamic mechanical analysis (DMA) storage modulus (5 Hz at room temperature (about 21° C.)) of the polymeric materials (e.g., thermoset materials) can range from about 100 MPa or 400 MPA to about 3000 MPa, or about 200 MPA to about 2750 MPa, or about 400 MPa to about 2300 MPa. A JIS 1096 elastic rebound can range from about 80% to about 100%, or about 85% to about 100%, or about 90% to about 100%. A Shore D hardness of the polymeric material can range from about 62 to about 100, or about 62 to about 84, or about 62 to about 75. In accordance with various aspects of these embodiments, the polymeric material is a polymeric foam material that includes pores, ranging in size from greater than 0 µm to about 1000 µm, or about 10 µm to about 400 µm, or about 10 µm to about 300 µm. The pores can be formed without microballoons, such as by using foaming agents and/or mixing techniques, as described in more detail below. The abrasive particles in the slurry can include multi-faceted or other particles having an average size of about 2 µm to about 100 µm, or about 10 µm to about 50 µm, or about 12 µm to about 40 µm. When the diamond slurry is used in connection with the polymeric materials, relatively high, uniform material removal rates (MRR) from hard substrate surfaces, such as (e.g., A-plane) sapphire and/or other hard materials described herein, can be achieved. It was surprisingly found that desired removal rates using the media could be obtained when the polymeric material did not include abrasive material. However, in accordance with some examples of the disclosure, the polymeric material includes abrasive material. Exemplary media including the polymeric material can be easily removed from a lapping platen to be reworked or replaced.

In accordance with additional exemplary embodiments of the disclosure, a method of lapping a surface of a substrate includes the steps of providing a lapping system comprising a platen and a polymeric (e.g., foam) material attached to the platen, providing a substrate, contacting the substrate with the polymeric material, and moving the polymeric material relative to the substrate to lap the surface of the substrate. The polymeric material can be as described herein. The method can also include providing a slurry that can include, for example, multi-faceted diamonds, such as those described herein. Additionally or alternatively, a method can include providing a carrier to retain one or more substrates during lapping. Exemplary methods described herein can be used to remove material from hard surfaces (e.g., a surface having hardness greater than the hardness of conventional fused silica glass, or about 1550 HB Brinell scale or 7 Moh's scale), such as sapphire (e.g., the A, C, or R planes of sapphire), other gem stones, such as emeralds and rubies, ceramics, metals, such as titanium, other materials as described herein, and similar materials.

In accordance with additional embodiments of the disclosure, a polymeric (e.g., foam) material for lapping a surface of a substrate includes one or more thermoset or thermoplastic materials, such as one or more thermoset materials selected from the group consisting of polyurethane, polyurea, hybrid polyurethane-polyurea, polyimide, polyarimid, epoxy, and other polymer hybrids thereof, and has a density of about 0.85 g/cm$^3$ to about 3.0 g/cm$^3$ or 0.9 g/cm$^3$ to about 1.3 g/cm$^3$ and/or a JIS 1096 compressibility between about 1.0% and about 8.0% and/or a Shore D hardness of about 62 to about 100, or about 62 to about 84, or about 62 to about 75. The polymeric foam material can optionally include abrasive material.

In accordance with further exemplary embodiments of the disclosure, a lapping apparatus includes a platen (e.g., a stainless steel platen) and polymeric (e.g., foam) material, as described herein, attached to the platen.

In accordance with yet additional exemplary embodiments of the disclosure, a method of forming polymeric (e.g., foam) material includes the steps of mixing one or more first compounds (e.g., having one or more reactive hydrogens associated therewith), reacting one or more second compounds (e.g., in the case of polyureas, polyurethanes, and polyurea-polyurethane hybrids, one or more polyisocyanates, derivatives thereof, or products thereof) with the one or more first compounds to form a composition and pouring the composition into a mold. Exemplary methods can include mixing in other compounds, such as fillers, abrasives, catalysts, surfactants, and the like, with the first compounds, the second compounds and/or the composition. In accordance with further exemplary aspects of these embodiments, the polymeric material includes epoxy material. In these cases, an epoxy resin is blended with a hardener in either an open or closed mixing environment to produce a high density foamed elastomer or a solid (nonfoamed) elastomer. Exemplary epoxy resins include epoxide terminated diglycidyl esters of Bisphenol A, F, and S, epoxy phenol novolacs, aliphatics, or cycloaliphatics. Exemplary hardeners include active hydrogen compounds such as amines (primary and secondary), anhydrides, phenols, and thiols. In accordance with yet further aspects of the embodiments, the polymeric material can include one or more thermoplastics. Examples of the a suitable thermoplastic is or includes polycarbonate. In this case, a Bisphenol A derived polycarbonate sheet (e.g., available from Bayer called Makrolon) can be cut into the shape of a lapping pad. Other exemplary thermoplastics for lapping include aromatic containing polymers such as polystyrene, polyethylene terephthalate, aromatic polyimide, and aromatic polyamide (Aramides). These compounds are readily available in sheet form and can be cut and machined into lapping pads. In accordance with various aspects of these embodiments, the polymeric material is laminated with an adhesive (e.g., a pressure sensitive adhesive) on one side. Additionally or alternatively, exemplary methods include a step of forming grooves on a surface (e.g., the lapping surface) of the polymeric material.

BRIEF DESCRIPTION OF THE DRAWING FIGURES

A more complete understanding of the embodiments of the present disclosure may be derived by referring to the detailed description and claims when considered in connection with the following illustrative figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS OF THE DISCLOSURE

The description of exemplary embodiments of polymeric lapping materials, media, systems, apparatus, and methods of forming and using the materials, media, apparatus, and systems provided below is merely exemplary and is intended for purposes of illustration only; the following description is not intended to limit the scope of the disclosure or the claims. Moreover, recitation of multiple embodiments having stated features, compositions, or properties is not intended to exclude other embodiments having additional features, compositions, or properties, or other embodiments incorporating different combinations of the stated features, compositions, or properties, unless otherwise noted herein.

As used herein, lapping or to lap refers to an intermediate surface finishing step that is typically preceded by a grinding and/or cutting step and followed by a polishing step. A lapping process can be used to finish surfaces initially having an average roughness of greater than about 1 micron or with visible scratches or saw marks. Additionally or alternatively the surface to be lapped can have a visible defect size greater in length than about 1 mm to about 3 mm and a surface having defect sizes that are not detectable with the naked eye after the surface has been lapped.

Exemplary polymeric materials, media, apparatus and/or systems as described herein can be used to lap a hard surface of a substrate. By way of examples, polymeric materials, media, apparatus, systems, and methods as described herein can be used to lap hard-surface materials, such as sapphire (e.g., the A, C, or R planes of sapphire), other gem stones, such as emeralds and rubies, ceramics, metals, such as titanium, and similar materials. As used herein, the term "hard surface" or "hard-surface material" means a material having a hardness greater that the hardness of conventional hard silica glass (e.g., greater than about 1550 HB Brinell scale or about 7 Moh's scale). After lapping such materials, the hard-surface materials are often polished to further finish the surface of the materials. By way of example, polished surface typically have an average roughness of less than about 0.01 microns and have defects sized four microns or less. The polished hard-surface materials are suitable for use as electronic device displays, electronic device cases, electronic back plates, watch crystals, and a variety of other applications.

Exemplary polymeric materials, media, apparatus, systems, and methods described herein exhibit relatively high removal rates, uniformities of material removal, and/or high process yields, compared to traditional media used for the same or similar applications—e.g., lapping hard-surface materials. Further, exemplary methods of lapping a surface of a substrate using polymeric material, rather than a metal plate as the lapping surface, have relatively high throughput and/or relatively low cost compared to techniques that employ a metal surface as a lapping surface.

Figure 1:
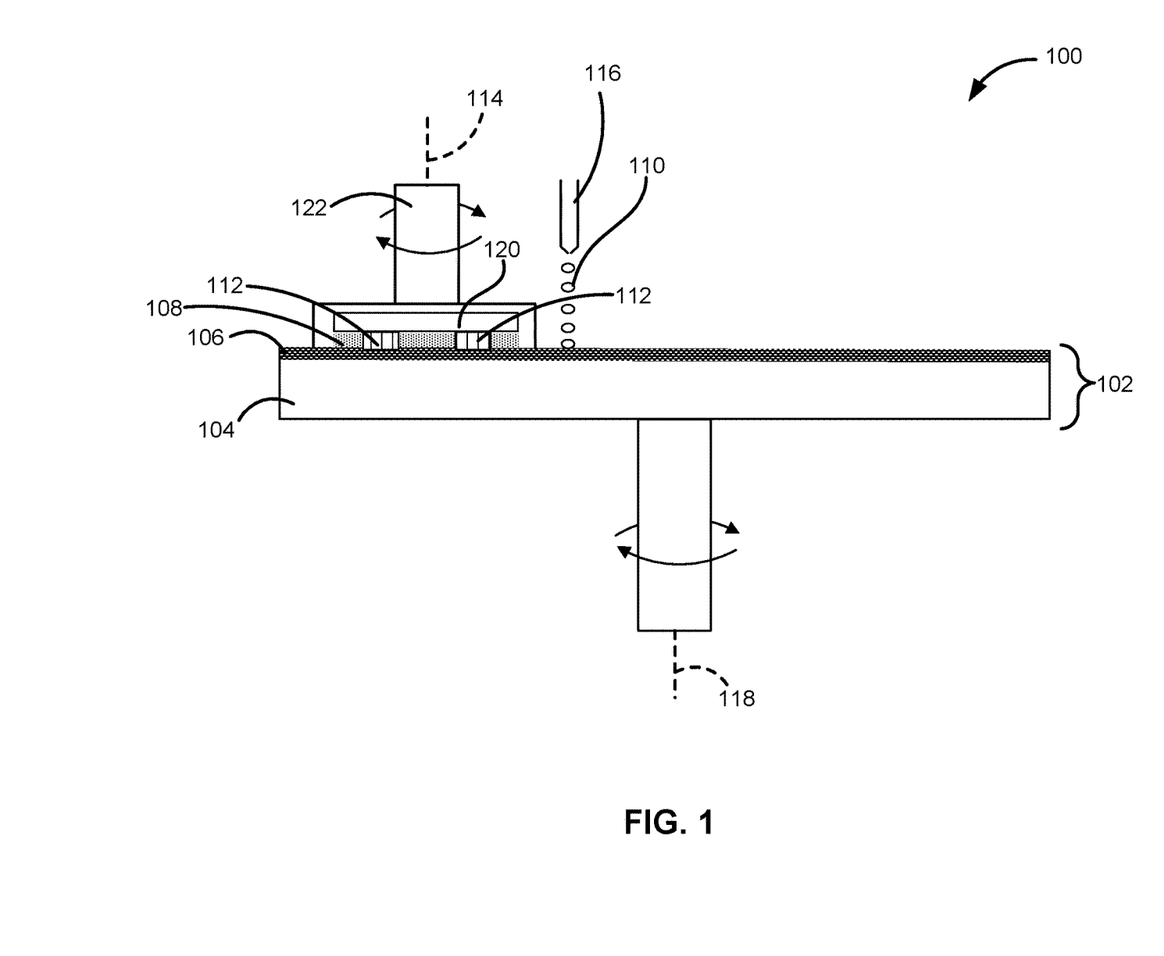
FIG. 1 illustrates a lapping system in accordance with various exemplary embodiments of the disclosure.

FIG. 1 illustrates a lapping system 100 in accordance with exemplary embodiments of the disclosure. Lapping system 100 includes a lapping apparatus 102, a carrier 108, and slurry 110, which can be dispensed from an optional slurry dispenser 116. Lapping system 100 can also include a weight 120 and/or a rotational arm 122.

Figure 2:
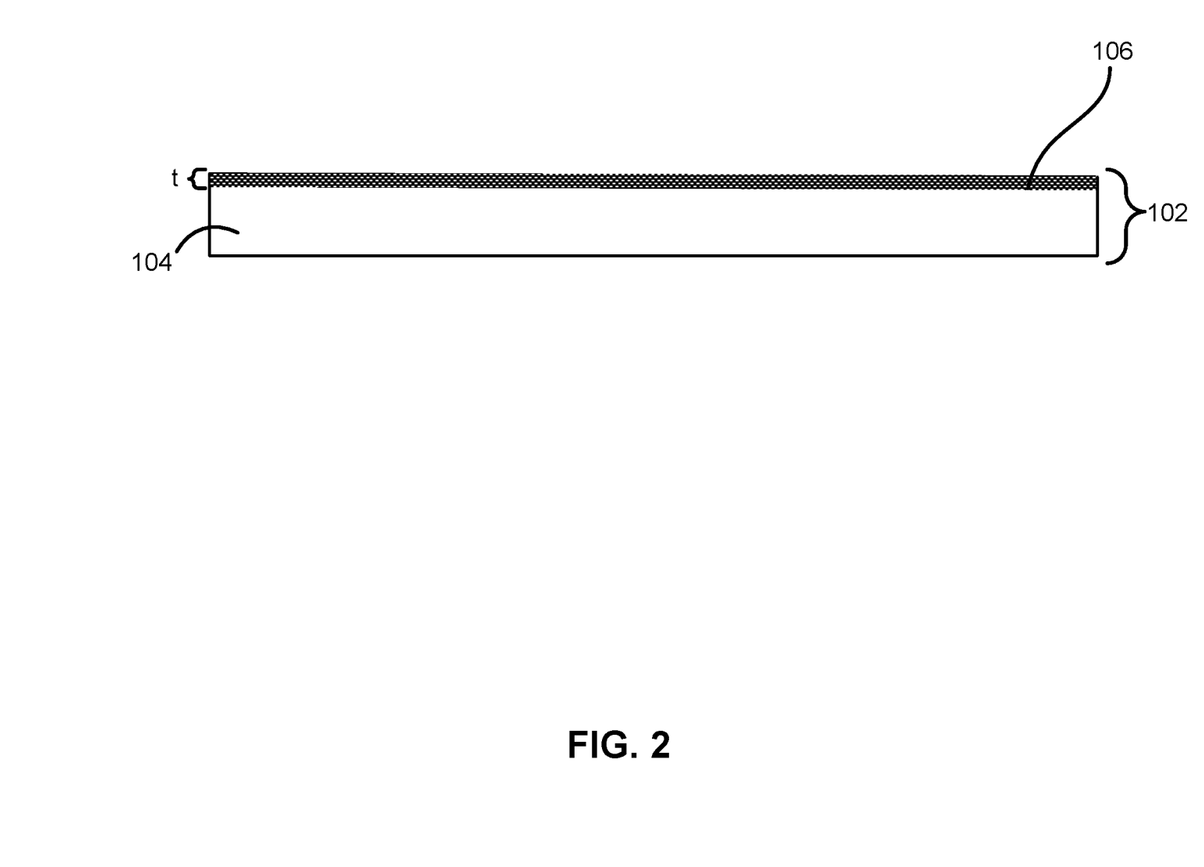
FIG. 2 illustrates a lapping apparatus in accordance with exemplary embodiments of the disclosure.

Lapping apparatus 102, illustrated in greater detail in FIG. 2, includes a platen 104 and polymeric material 106 removably attached to platen 104. Lapping apparatus 102 can rotate about an axis 118, as illustrated, and/or can perform other relative movement with respect to a substrate 112 surface.

Platen 104 can be formed of relatively rigid material, such as stainless steel or the like. Because platen 104 is not in direct contact with substrate 112 during lapping, platen 104 need not be formed of relatively soft material, such as copper. Further, because the working surface of lapping apparatus 102 includes removable polymeric material, platen 104 does not require reworking or finishing (e.g., reworking to flatten, restore parallelism, and/or form grooves within the metal platen), as often required with lapping surfaces comprising a metal plate.

Polymeric material 106 can be a thermoset material, a thermoplastic material, combinations of thermoset materials, combinations of thermoplastic materials, or a combination of one or more thermoplastic and/or thermoset materials. Further, unless otherwise noted, the material can be foamed or nonfoamed. By way of examples, the polymeric material can include one or more thermoset materials, such as polyurethane, polyurea, a polyurethane-polyurea hybrid, polyimide, polyarimid, epoxy, and/or other hybrids of such materials. By way of particular examples, polymeric material 106 comprises polyurea, polyurethane, or a polyurea-polyurethane hybrid. Exemplary properties of polymeric foam and nonfoam materials in accordance with exemplary embodiments of the disclosure are provided below in Table 1. It is thought that one or more polymeric material properties, such as those listed below, allow the abrasive particles within the slurry to become partially embedded within the polymeric material to achieve desired removal rates.

TABLE 1

| Polymeric Lapping Pad Comparison Chart | Composition | Method of Manufacture | MRR (micron/hr) | Density (g/cm3) | JIS Comp (%) | JIS Elastic Rebound (%) | Hardness (Shore D) | DMA Storage Modulus (MPa, 5 Hz @ RT) | Cell Size (μm) |
|---|---|---|---|---|---|---|---|---|---|
| Conventional Process (Metal Lapping Plate) | Copper, Cast Iron | Molten metal casting | 60-90 50-100 | 9.0 | NA | NA | NA | 160000 | 0 |
| Example 1 | Polyurethane-urea hybrid | Cast Elastomer | 90 80-100 70-110 | 1.17 | 5.50% | 97% | 69 | 919 | 0-300 |

TABLE 1-continued

| Polymeric Lapping Pad Comparison Chart | Composition | Method of Manufacture | MRR (micron/hr) | Density (g/cm3) | JIS Comp (%) | JIS Elastic Rebound (%) | Hardness (Shore D) | DMA Storage Modulus (MPa, 5 Hz @ RT) | Cell Size (μm) |
|---|---|---|---|---|---|---|---|---|---|
| Example 2 | Epoxy | Cast Elastomer | 90<br>80-100<br>70-110 | 1.09 | 5.30% | 99% | 79 | 2339 | 0-300 |
| Example 3 | Polycarbonate | Thermoplastic extrusion | 136<br>120-150<br>110-160 | 1.18 | 5.50% | 93% | 72 | 1754 | 0 |
| Example 4 | Polystyrene | Thermoplastic extrusion | 73<br>60-80<br>50-90 | 1.02 | 5.40% | 88% | 72 | 1000 | 0 |
| Example 5 | Polypropylene | Thermoplastic extrusion | 13<br>8-15<br>7-117 | 0.9 | 4.80% | 102% | 67 | 1457 | 0 |
| Example 6 | HDPE | Thermoplastic extrusion | 3<br>2-5<br>3-7 | 0.95 | 4.60% | 90% | 65 | 1534 | 0 |
| | | | 1st Range | 0.7-3.0<br>0.85-3.0 | 1.0%-15.0% | 80%-100% | 30-100 or 62-100 | 100-3000 | 0-1000 |
| | | | Second Range | 0.9-1.3 | 1.0%-10.0% | 85%-100% | 62-85 | 300-2500 | 0-400 |
| | | | Third Range | 1.0-1.25 | 1.0%-8.0% | 90%-100% | 62-80 | 400-2400 | 0-300 |

A thickness (t) of polymeric material 106 can vary according to various factors, including whether the material will be reworked (e.g., new grooves formed on a surface of the polymeric material) or disposed of after a number of lapping runs. By way of examples, the thickness can range from about 0.5 mm to about 10 mm, or about 0.75 mm to about 5 mm, or about 1 mm to about 3 mm, about 1 mm to about 20 mm, or be about 1.3 mm. During the development of the polymeric material, it was surprisingly and unexpectedly found that a polymeric material (e.g., 4-6 mm or 5 mm thick) had the same or better material removal rates and/or uniformity compared to traditional metal plates and lasted as long (between reworking or replacement steps) as the typical metal plates.

Slurry 110 can include diamond or other (e.g., silicon carbide, aluminum oxide, boron carbide, and the like) particles (e.g., having an average size of about 1 to about 100 microns, about to 5 to about 40 microns, or about 20 μm) in a carrier liquid. An exemplary slurry is available from Sandvik under the name DI900-C1.

Carrier 108 can be configured to retain one or more substrates 112 during a lapping process. Carrier 108 can include teeth that engage with, e.g., a platen of lapping system. Weight 120 can be of desired weight and can be separate or integral with carrier 108. Carrier 108 can rotate about axis 114, about axis 118, or employ other suitable movement.

Carrier 108 can be formed of any suitable material. By way of examples, carrier 108 can be formed of stainless steel and/or fiberglass. A thickness of carrier 108 is generally no thicker than the final desired thickness of the substrate after the lapping process.

As noted above, lapping system 100 and methods of using lapping system 100 can remove material from hard surfaces (e.g., a surface having hardness greater than the hardness of conventional fused silica glass, or about 1550 HB Brinell scale or 7 Moh's scale). Indeed, the inventors surprisingly and unexpectedly found that lapping system 100 exhibited A-plane sapphire removal rates of about 36 μm/hr to about 96 μm/hr. Table 1 above illustrates removal rates obtained using polymeric material in accordance with examples of the disclosure.

Use of lapping apparatus 102, rather than a traditional soft metal (e.g., copper) plate, has several advantages. As noted above, polymeric material can be easily reworked/grooved (it is generally lighter and much easier to remove than a metal lapping plate) and/or it can be easily replaced, making lapping system 100 easier and less expensive to use to lap a surface of substrate 112.

Figure 3:
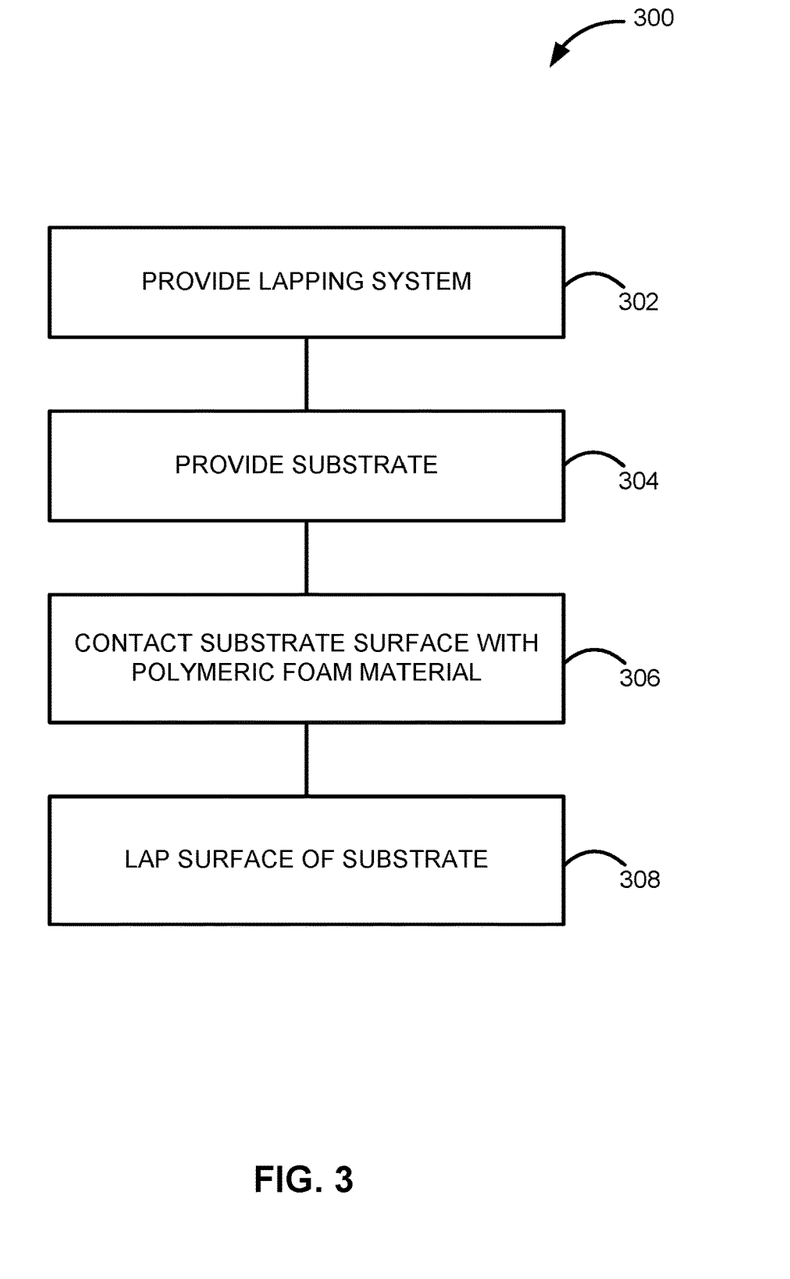
FIG. 3 illustrates a method of forming polymeric lapping material in accordance with yet additional exemplary embodiments of the disclosure.

Turning now to FIG. 3, a method 300 of lapping a surface of a substrate is illustrated. Method 300 includes the steps of providing a lapping system (step 302), providing a substrate (step 304), contacting a substrate surface with polymeric material (step 306), and lapping a surface of the substrate (step 308).

During step 302, a lapping system, including a polymeric material lapping surface (e.g., lapping system 100) is provided. A suitable lapping machine suitable for use as part of system is available from SpeedFAM under the name 9B-5L-III.

During step 304, one or more substrates are loaded onto the lapping system (e.g., into a carrier 108). In accordance with various embodiments of the disclosure, the substrates have previously been subjected to one or more cutting or grinding processes and/or will be subsequently subjected to one or more polishing processes. Exemplary substrates include a hard surface—e.g., a surface having hardness greater than the hardness of conventional fused silica glass, or about 1550 HB Brinell scale or 7 Moh's scale, such as sapphire (e.g., the A, C, or R planes of sapphire), other gem stones, such as emeralds and rubies, ceramics, metals, such as titanium, and similar materials. By way of particular example, the substrate comprises or is sapphire and the A-plane of sapphire is lapped using method 300. Other surfaces that can be lapped during this step include semiconductors, such as silicon and germanium arsenide (e.g., right after slicing) and other ceramic materials.

During step 306, the substrate surface is placed in contact with polymeric material (e.g., polymeric material 106, illustrated in FIGS. 1 and 2). Steps 304 and 306 can be performed simultaneously. As illustrated in FIG. 1, a downward pressure can be applied to a carrier (e.g., carrier 108) using weight 120.

During step 308, the substrate and the polymeric material are moved relative to each other to remove material from the substrate surface. In the example illustrated in FIG. 1, carrier 108 retains substrate 112 during the lapping process. As noted above, carrier 108 can cause the substrate to rotate about axis 114 of carrier 108 and/or axis 118 of lapping apparatus 102. Lapping system 100 can additionally or alternatively be configured to cause substrate 112 surface to move relative to lapping apparatus 102 surface by orbital or other relative rotational movement. A downward force can be applied to carrier 108 during step 308 to facilitate achieving desired material removal rates and/or uniformity.

A slurry (e.g., slurry 110) can be provided to a surface of the polymeric material during step 308. The slurry can include abrasive particles (e.g., multifaceted diamond particles—also referred to as diamonds, or other abrasives, such as those noted herein) suspended in a solution. An exemplary slurry is available from Sandvik under the name DI900-C1.

Exemplary lapping removal rates using method 300 and/or system 100 and/or apparatus 102 are greater than 20 μm/hr and can range from about 20 μm/hr to about 60 μm/hr, 20 μm/hr to about 120 μm/hr, 35 μm/hr to about 90 μm/hr, 60 μm/hr to about 140 μm/hr, about 35 μm/hr to about 90 μm/hr, or about 60 μm/hr to about 140 μm/hr, using a high-density polyurethane foam material or solid thermoplastic lapping an A-plane sapphire surface.

Methods of Forming Polymeric Material and Media

The polymeric materials described herein can be formed in a variety of ways, depending on the particular polymeric material. Various methods include mixing one or more first compounds (e.g., having one or more reactive hydrogens associated therewith), reacting one or more second compounds with the one or more first compounds to form a composition, and poring the composition into a mold. Exemplary methods can include mixing in other compounds, such as fillers, colorants, abrasives, catalysts, foaming or blowing agents (in the case of polymeric foam materials), surfactants or cell stabilizers, defoamers, and the like, with the first compounds, the second compounds and/or the composition.

In the case of polyurea, polyurethane, and polyurea-polyurethane hybrid materials, the polymeric material can be formed by mixing one or more polyamines or polyols (one or more first compounds) with one or more of polyisocyanates, polyisocyanate derivatives, and polyisocyanate products (one or more second compounds) to form a polyurethane, polyurethane/polyurea hybrid or polyurea-based composition; and pouring the composition into a mold. Exemplary methods can include adding and mixing additional materials as described herein or as otherwise known in the art. Various polyurethane lapping materials as described herein can be prepared in the presence of a catalyst. Others can be formed without a catalyst. Classes of suitable catalysts include, but are not limited to, tertiary amines, such as triethylamine, and organometallic compounds, such as dibutyltin dilaurate. Fillers or abrasives can also be added to aid the abrasive slurry in the lapping process by providing a fixed abrasive in the polymer. Exemplary fillers/abrasives include organic and/or inorganic fillers. Exemplary inorganic fillers can include exemplary abrading particles that include, but are not limited to, particles of, for example, cerium oxides, silicon oxides, aluminum oxides, zirconia, iron oxides, manganese dioxides, kaolin clays, montmorillonite clays, titanium oxides, silicon carbides, boron carbides, and diamond. A size of the inorganic particles can range from about 0.001 microns to about 1000 microns, or about 0.5 microns to about 3.0 microns average diameter. Exemplary organic fillers include polyurethane foam, epoxy, polystyrene, polyacrylic, polyimide, or other thermoplastic or thermoset materials. The polymeric material can include 0 to about 80 weight percent filler. Exemplary filler loading ranges from about 15 wt. % to about 30 wt. % or about 20 wt. % to about 25 wt. % by weight.

In accordance with additional examples, a defoamer can be added to the first compound, the second compound, or the composition to control a size of the pores. Exemplary defoamers include Dow Corning's DC series silicone fluids.

Exemplary blowing agents, also referred to as foaming agents, can be used to facilitate making polyurea, polyurethane, and/or polyurethane-polyurea material into a foam. Exemplary foaming agents include one or more of a hydroflourocarbon (HFC) or azeotrope of 2 or more hydrocarbon (HFCs), such as 1,1,1,3,3-pentaflourobutane (HFC-365); 1,1,1,2-tetraflouroethane (HFC-134a), methoxy-nonafluorobutane (HFE-7100) and a free radical initiator comprising a nitrile, such as 2,4-Dimethyl, 2,2'-Azobis Pentanenitrile. Particular foaming agents include the HFCs Solkane® 365mfc and 134a (Solvay, Hannover, Germany), and free radical initiators Vazo 52 (DuPont, Wilmington, Del.). Additionally or alternatively, azodicarbonamide can be used as an exemplary thermal decomposition agent to form pores during the manufacture of the polymeric material. Water is also commonly used to foam polyurethane/polyurea systems via the reaction between water and isocyanate producing carbon dioxide. Various combinations of foaming agents, including, but not limited to those disclosed herein, can be used to form material or media including the material and are contemplated in this disclosure. It is thought that an amount of the blowing agent/foaming agent can be important to form a polymeric foam material with desired properties. In accordance with some embodiments of the disclosure, the polymeric foam material is formed with less than about 5 wt. % foaming agent, or about 0 wt. % to about 3 wt. % foaming agent, or about 0 wt. % to about 1 wt. % foaming agent in the composition. Additionally or alternatively, porosity can be added during the manufacture of the polymeric material by entraining gas bubbles into the material, as described in more detail below.

Exemplary surfactants also referred to as cell stabilizers, include Momentive brand L-6100 and Dow Corning DC-193. Typical examples include polydimethylsiloxane silicone fluids that are provided at different molecular weights as indicated by viscosity (which can range from 0.65 to 60,000 centistokes) with exemplary materials being low viscosity fluids or siloxane-poly ether copolymers. The siloxane portion can be either hydrolysable or non hydrolysable. Some examples are non hydrolysable. The polyether portion of the copolymer typically is either a random or block copolymer of ethylene oxide and propylene oxide of varying relative ratios and overall molecular weights.

The materials or compounds can be mixed together using, for example, high-shear blending to incorporate air and/or particles into a matrix. Additionally or alternatively, gas, such as nitrogen, can be added during the mixing or settling processes. The polymeric lapping material can be formed as a solid elastomer or high-density foam in an open or closed mold.

Exemplary methods of forming polymeric material can be accomplished in a single mixer. In accordance with various exemplary methods, one or more thermosets or building blocks thereof are mixed, for example, in an open-air container with the use of a high-shear impeller. During the mixing process, atmospheric air can be entrained in the mix by the action of the impeller, which pulls air into a vortex created by the rotation. The entrained gas bubbles can act as nucleation sites for a foaming process. A blowing agent, such as water, can be added to the mix to facilitate a reaction, which produces a gas, such as $CO_2$, resulting in cell growth. During this open-air mix and while in the liquid phase, other optional additives can be added to the mix, such as surfactants or additional blowing agents. Conversely, thermosets or building blocks thereof can be degassed during a thermosetting reaction under high vacuum and mixed without air entrainment. In this case, surfactants, blowing agents, and frothing agents can be or are omitted. The resulting polymeric lapping pad is a solid thermoset plastic—e.g., having the properties noted herein.

In some example embodiments, there is a short time window after the addition of the one or more polyisocyanates or derivatives or products thereof of about 1-2 minutes, during which the viscosity of the mix remains low, called the "low-viscosity window." The mix may be poured into a mold during this window. In one example embodiment, quickly after the pour, the window passes, and existing pores become effectively frozen in place. Although pore motion can essentially have ended, pore growth can continue, for example, as $CO_2$ continues to be produced from a polymerization reaction. In one example embodiment, the molds are oven cured, for example, for about 6 to about 12 hours at about 100° C. to about 130° C. or about 115° C. to substantially complete the polymerization reaction.

After oven curing, the molds can be removed from the oven, and allowed to cool. The molded polymeric material can be skived to produce slices of the polymeric material that can be made into circular pads or rectangular-shaped pads or pads of any other desired shape. For example, the slices can be made by cutting to shape with a punch or cutting tool or any other suitable instrument. In some example embodiments, an adhesive (e.g., a pressure sensitive adhesive) is applied to one side of the pad. Additionally or alternatively, the polymeric material surface can be grooved, if desired, for example, on the lapping surface in a pattern, such as a cross-hatched pattern (or any other suitable pattern). By way of additional examples, a geometry or shape of grooves can comprise at least one of a square trough, a rounded trough, and a triangular trough. In addition to the specific embodiments disclosed, numerous physical configurations of various geometries to the lapping surface are contemplated in this disclosure. The grooves can be created via any mechanical method capable of producing grooves in polymeric material as described herein. For example, grooves can be created with a circular saw blade, a punch, a needle, a drill, a laser, an air-jet, a water jet, or any other instrument capable of rendering grooves in the pad. Moreover, grooves can be made simultaneously with a multiple gang-saw jig, a multiple-drill bit jig, a multiple punch jig, a multiple-needle jig, or the like.

As noted above, a method of forming polymeric material can include the use of closed-loop inline mixing. In this case, the polymeric material can be produced in a closed-loop inline mixer. By way of example, a polyurethane/polyurea hybrid comprised of an NCO terminated prepolymer and a polyamine curing agent can be formed using closed-loop inline mixing. To ensure high density polymeric films having desired properties—such as those noted above in Table 1, are formed, vacuum is applied to the NCO terminated prepolymer and/or the poly-amine curing agent at greater than 29 in. Hg for longer than 30 minutes in order to remove bubble nucleating agents such as dissolved air/nitrogen and residual water. After degas is complete, the NCO prepolymer and the poly-amine curing agent are injected continuously into a closed mixing head where they are blended together under high shear and/or high pressure impingement and then ejected into a mold. The mold can be open or closed and further degassing via vacuum can be used to remove bubbles entrained by the mixing operation in a closed mold.

In accordance with alternative embodiments of the disclosure, the polymeric material includes epoxy. In these cases, an epoxy resin is blended with a hardener in either an open or closed mixing environment to produce a high density polymeric material—e.g., an elastomer or a solid elastomer. Epoxy resins typically are comprised of epoxide terminated diglycidyl esters of Bisphenol A, F, and S, epoxy phenol novolacs, aliphatics, or cycloaliphatics. Hardeners include active hydrogen compounds such as amines (primary and secondary), anhydrides, phenols, and thiols.

In accordance with other aspects of the embodiments, the polymeric material includes polycarbonate. In these cases, a Bisphenol A derived polycarbonate sheet (e.g., available from Bayer called Makrolon) can be cut into the shape of a lapping pad and grooves can be formed within a surface of the material.

In accordance with yet other exemplary embodiments of the disclosure, the polymeric material includes one or more thermoplastics. Exemplary thermoplastics include aromatic containing polymers such as polystyrene, polyethylene terephthalate, aromatic polyimide, and aromatic polyamide (Aramides). Exemplary thermoplastics are available in sheet form and can be cut and machined into lapping pads. Thermoplastics are typically extruded into the sheet form and then cut into the shape of the lapping pad. Grooves can be formed within a surface of the material.

Lapping Media

Lapping media can include a polymeric material as described herein. The lapping media can include grooves on a surface. Additionally or alternatively the lapping media can include adhesive material on a surface. Further, the lapping media can include one or more layers or sheets of polymeric material as described herein alone, or in combination with layers of other polymeric material.

SPECIFIC EXAMPLES

Conventional Process (Metal Lapping Plate): Copper plate. A 0.5 inch thick copper disc on an aluminum substrate has a total weight of over 100 lbs. The copper disc in contact with workpieces exhibits grooves with a depth of 0.25 mm. As the copper disc wears, the grooves diminish and need to be reintroduced to the surface. Resurfacing the copper disc consists of lapping away the original grooves, flattening the disc and re-grooving and is typically done on another machine, which introduces the need to physically relocate the plates several times throughout their effective lifetime. A removal rate of 60 µm/hr was achieved using double sided polishing and diamond slurry.

Example 1: Foamed Polymeric Material

Polyurethane/polyurea hybrid. 100 parts of a prepolymer prepared from polytetramethylene ether glycol (PTMEG) diol, diethylene glycol (DEG), and toluene diisocyanate with an isocyanate (NCO) content of 9.5%-10.5% by weight is stirred with a Cowles type high shear blade in an open reactor tank. 1.2 parts of a 50-100 cSt silicone fluid are added to the prepolymer and blended under high shear conditions such that air is entrained into the mixture. 30.2 parts of Methylene Bis-orthochloroanaline are then added to the mixture, blended thoroughly under high shear and then poured into an open mold. The mixture is allowed to green cure at room temperature for 15 minutes and then is post-cured at 120 C for 6 hours. The resulting high density polyurethane/polyurea hybrid foam is then sliced into sheets and groove patterns and pressure sensitive adhesive (PSA) are applied. Workpieces were lapped using a SpeedFAM 9B, with the following conditions: pressure: 4.03 psi; speed of top plate: −15 rpm; speed of bottom plate: 45 rpm; slurry type: DI 900-C1 (12-25 µm diamond particle size); slurry flow: 8 mL/min. A removal rate of 90 µm/hr from the surface of an A-plane sapphire workpiece was achieved.

Example 2: Foamed Polymeric Material

Epoxy. 100 parts of a Bis-phenol A type epoxy resin and 20 parts of an amine blend consisting of Diethylenetriamine, triethylenetetramine, and propoxylated triethylenetetramine are heated to 40-50 C and degassed at minimum 29.5 in Hg for minimum 30 minutes. The two components are then blended in a closed loop mixer with a low shear dispenser head. This epoxy blend is then ejected into an open mold and allowed to build viscosity until hardened. The casting is allowed to cure for 24-48 hours at 20-25 C. The casting is then machined into a lapping pad sheet and then groove patterns are cut and PSA is applied. Workpieces were lapped using a SpeedFAM 9B, with the following conditions: pressure: 4.03 psi; speed of top plate: −15 rpm; speed of bottom plate: 45 rpm; slurry type: DI 900-C1 (12-25 µm diamond particle size); slurry flow: 8 mL/min. A removal rate of 90 µm/hr from the surface of an A-plane sapphire workpiece was achieved.

Example 3: Non-Foamed Polymeric Material

Polycarbonate. Sheet stock of polycarbonate Bayer Makrolon brand is converted into a sheet suitable for a lapping pad. The pad is then machined into a lapping pad sheet and groove patterns are cut and PSA is applied. Workpieces were lapped using a SpeedFAM 9B, with the following conditions: pressure: 4.03 psi; speed of top plate: −15 rpm; speed of bottom plate: 45 rpm; slurry type: DI 900-C1 (12-25 µm diamond particle size); slurry flow: 8 mL/min. A removal rate of 136 µm/hr from the surface of an A-plane sapphire workpiece was achieved.

Although exemplary embodiments of the present disclosure are set forth herein, it should be appreciated that the disclosure is not so limited. For example, although materials, media, apparatus, systems, and methods are described in connection with lapping hard-surface materials, the invention is not so limited—unless otherwise stated. Various modifications, variations, and enhancements of the materials, methods, and media set forth herein can be made without departing from the spirit and scope of the present disclosure.

What is claimed is:

1. A lapping system comprising:
   a platen;
   a non-porous polymeric material attached to the platen, wherein a density of the non-porous polymeric material ranges from about 0.7 g/cm$^3$ to about 3.0 g/cm$^3$; and
   a slurry comprising abrasive particles.

2. The lapping system of claim 1, wherein the non-porous polymeric material consists essentially of thermoset material.

3. The lapping system of claim 1, wherein the density of the non-porous polymeric material is greater than 0.9 g/cm$^3$.

4. The lapping system of claim 1, wherein the non-porous polymeric consists of a thermoset polymer.

5. The lapping system of claim 1, wherein the non-porous polymeric material comprises one or more materials selected from the group consisting of polyurethane, polyurea, polyimide, polyarimid, polycarbonate and epoxy.

6. The lapping system of claim 1, wherein the non-porous polymeric material consists of polyurethane-urea hybrid material.

7. The lapping system of claim 6, wherein the lapping system exhibits a material removal rate of A-plane sapphire of ≥20 µm/hr.

8. The lapping system of claim 1, wherein a compressibility of the non-porous polymeric material is between about 1% and about 15%.

9. The lapping system of claim 1, wherein the non-porous polymeric material comprises grooves.

10. The lapping system of claim 1, wherein the non-porous polymeric material comprises no inorganic filler.

11. The lapping system of claim 1, wherein a storage modulus of the non-porous polymeric material ranges from about 100 MPa to about 3000 MPa.

12. The A method of lapping a surface of a substrate, the method comprising the steps of:
    providing a lapping system comprising a platen and a non-porous polymeric material attached to the platen, wherein the non-porous polymeric material has a density between about 0.85 g/cm$^3$ and about 3.0 g/cm$^3$;
    providing a substrate;
    contacting the substrate with the non-porous polymeric material; and
    moving the non-porous polymeric material relative to the substrate to lap the surface of the substrate.

13. The method of claim 12, wherein the substrate has a hardness greater than 1550 HB Brinell scale.

14. The method of claim 13, followed by a step of polishing the substrate.

15. The method of claim 12, wherein the non-porous polymeric material comprises one or more materials selected from the group consisting of polyurethane, polyurea, polyimide, polyarimid, polycarbonate, and epoxy.

16. The method of claim 12, further comprising a step of providing a slurry.

17. The method of claim 16, wherein the slurry comprises multi-faceted diamonds.

18. A non-porous polymeric material for lapping a surface of a substrate, the non-porous polymeric material comprising one or more thermoset materials and having a density of about 0.7 g/cm$^3$ to about 3.0 g/cm$^3$.

19. The non-porous polymeric material of claim 18, wherein the non-porous polymeric material does not comprise abrasive particles.

20. The non-porous polymeric material of claim 18, wherein a compressibility of the non-porous polymeric material is between about 1% and about 15%.

* * * * *

UNITED STATES PATENT AND TRADEMARK OFFICE
CERTIFICATE OF CORRECTION

PATENT NO. : 10,092,991 B2
APPLICATION NO. : 15/222779
DATED : October 9, 2018
INVENTOR(S) : George Wasilczyk et al.

Page 1 of 1

It is certified that error appears in the above-identified patent and that said Letters Patent is hereby corrected as shown below:

In the Claims

Column 14, Line 7 please insert -- materials -- after non-porous polymeric

Column 14, Line 29 please delete "The"

Signed and Sealed this
Fourth Day of December, 2018

Andrei Iancu
*Director of the United States Patent and Trademark Office*